(12) United States Patent
Rueblinger et al.

(10) Patent No.: US 9,773,142 B2
(45) Date of Patent: Sep. 26, 2017

(54) SYSTEM AND METHOD FOR SELECTIVELY READING CODE SYMBOLS (71) Applicant: Hand Held Products, Inc., Fort Mill, SC (US)

(72) Inventors: Gregory Rueblinger, Stratford, NJ (US); Kevin Saber, Sewell, NJ (US); David Wilz, Sewell, NJ (US); Erik Van Horn, Ocean View, NJ (US); Kamal Azoqa, Irvine, CA (US); Malcolm Gillespie, Marcellus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/947,296

(22) Filed: Jul. 22, 2013

(65) Prior Publication Data
US 2015/0021397 A1  Jan. 22, 2015

(51) Int. Cl.
*G06K 5/04* (2006.01)
*G06K 7/14* (2006.01)

(52) U.S. Cl.
CPC .... *G06K 7/1443* (2013.01); *G06K 2207/1011* (2013.01)

(58) Field of Classification Search
CPC .................................................. G06K 7/1443
USPC .................................................. 235/462.08
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |
| 8,366,005 | B2 | 2/2013 | Kotlarsky et al. |
| 8,371,507 | B2 | 2/2013 | Haggerty et al. |

(Continued)

FOREIGN PATENT DOCUMENTS

| | | |
|---|---|---|
| EP | 2093695 B1 | 8/2009 |
| EP | 2450828 A2 | 5/2012 |

(Continued)

OTHER PUBLICATIONS

U.S. Appl. No. 13/367,978, filed Feb. 7, 2012, (Feng et al.); now abandoned.

(Continued)

*Primary Examiner* — Christle I Marshall
*Assistant Examiner* — Asifa Habib
(74) *Attorney, Agent, or Firm* — Additon, Higgins & Pendleton, P.A.

(57) ABSTRACT

A system for selectively reading code symbols includes a code-symbol-capturing subsystem for acquiring information about code symbols within the code-symbol-capturing subsystem's field of view. The system also includes a code-symbol-decoding processor that detects a marked region of interest within the code-symbol-capturing subsystem's field of view. After initialization, the code-symbol-decoding processor decodes only those code symbols falling within the marked region of interest.

20 Claims, 5 Drawing Sheets

(56) References Cited

U.S. PATENT DOCUMENTS

| | | |
|---|---|---|
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2005/0279832 A1* | 12/2005 | Kobayashi et al. ...... 235/462.07 |
| 2007/0063048 A1 | 3/2007 | Havens et al. |
| 2007/0119939 A1 | 5/2007 | Epshteyn et al. |
| 2008/0185432 A1 | 8/2008 | Caballero et al. |
| 2009/0108071 A1 | 4/2009 | Carlson |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0075931 A1* | 3/2011 | Chiou ...................... G06K 7/14 382/190 |
| 2011/0169999 A1 | 7/2011 | Grunow et al. |
| 2011/0202554 A1 | 8/2011 | Powilleit et al. |
| 2012/0111945 A1* | 5/2012 | Kearney .................. 235/462.11 |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |

(56) References Cited

U.S. PATENT DOCUMENTS

| | | | |
|---|---|---|---|
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131445 A1 | 5/2014 | Ding et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

FOREIGN PATENT DOCUMENTS

| | | |
|---|---|---|
| GB | 2518284 A | 3/2015 |
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

(56) References Cited

OTHER PUBLICATIONS

U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
Combined Search and Examination Report, Application No. GB1412470.5, Related to Current Application, Dated Jan. 13, 2015, 6 pages.

\* cited by examiner

SYSTEM AND METHOD FOR SELECTIVELY READING CODE SYMBOLS

FIELD OF THE INVENTION

The present invention relates to code symbol readers. More specifically, the present invention relates to a system and method for selectively reading code symbols.

BACKGROUND

There are instances when more than one code symbol (e.g., barcode, QR code, etc.) may be present within the field of view of a code symbol reader (e.g., barcode scanner). A barcode menu, for example, may be a page with several barcodes in each row. In these cases, when the user scans an entire row of barcodes and the reader returns the information relating to a decoded barcode (e.g., product identification number), the user may not know which barcode the reader actually decoded. In the case of handheld scanners, for example, the user may attempt to solve this problem by adjusting the field of view of the scanner (e.g., by bringing the scanner closer to the barcode that is desired to be decoded). This solution is not always practical, however, because it takes time for the user to reposition the scanner to achieve the desired field of view, and because the scanner may not be capable of repositioning (e.g., a fixed-position scanner). Particularly in situations requiring repetitive scanning of barcodes in the same position within the scanner's field of view, requiring the user to manually reposition the scanner to adjust the field of view to that one area results in needless use of the operator's time and focus.

A need therefore exists for a system for reading code symbols that can be initialized to read only those code symbols that fall within a region of interest that is within the system's field of view. For example, a need exists for a system for reading code symbols that can be initialized to decode only the barcodes that fall within the second column on a barcode menu having four columns.

SUMMARY

Accordingly, in one aspect, the present invention embraces a system for reading code symbols. The system includes a code-symbol-capturing subsystem for acquiring information about code symbols within the code-symbol-capturing subsystem's field of view. The system also includes a code-symbol-decoding processor. The code-symbol-decoding processor is configured for detecting a marked region of interest within the code-symbol-capturing subsystem's field of view. The code-symbol-decoding processor is also configured for decoding the code-symbol information inside the marked region of interest within the code-symbol-capturing subsystem's field of view. The code-symbol-decoding processor is also configured to disregard code-symbol information that is outside the marked region of interest.

In an exemplary embodiment, the code-symbol-capturing subsystem is an imaging subsystem for capturing images within the imaging subsystem's field of view.

In another exemplary embodiment, the code-symbol-capturing subsystem is a laser scanning subsystem for scanning code symbols within the laser scanning subsystem's field of view.

In yet another exemplary embodiment, the code-symbol-decoding processor is configured for detecting the region of interest in response to a user-positioned marker.

In yet another exemplary embodiment, the code-symbol-decoding processor is configured for detecting the region of interest in response to a user-positioned marker, which user-positioned marker is a code symbol.

In yet another exemplary embodiment, the code-symbol-decoding processor is configured for detecting the region of interest in response to a user-positioned marker, which user-positioned marker is a signal-enhancing marker.

In yet another exemplary embodiment, the code-symbol-decoding processor is configured for detecting the region of interest in response to a user-positioned marker, which user-positioned marker is a signal-decreasing marker.

In another aspect, the present invention embraces a system for reading code symbols that includes a code-symbol-capturing subsystem configured to detect a marked region of interest within the code-symbol-capturing subsystem's initial field of view. The code-symbol-capturing subsystem is also configured to adjust the code-symbol-capturing subsystem's initial field of view to an adjusted field of view that corresponds to the region of interest. The code-symbol-capturing subsystem is also configured to acquire information about code symbols within the code-symbol-capturing subsystem's adjusted field of view that corresponds to the region of interest. The system for reading code symbols also includes a code-symbol-decoding processor for processing code-symbol information acquired by the code-symbol-capturing subsystem.

In an exemplary embodiment, the code-symbol-capturing subsystem is an imaging subsystem for capturing images of code symbols.

In another exemplary embodiment, the code-symbol-capturing subsystem is a laser scanning subsystem for scanning code symbols.

In yet another exemplary embodiment, the code-symbol-capturing subsystem is configured for detecting the region of interest in response to a user-positioned marker.

In yet another exemplary embodiment, the code-symbol-capturing subsystem is configured for detecting the region of interest in response to a user-positioned marker, which user-positioned marker is a code symbol.

In yet another exemplary embodiment, the code-symbol-capturing subsystem is configured for detecting the region of interest in response to a user-positioned marker, which user-positioned marker is a signal-enhancing marker.

In yet another exemplary embodiment, the code-symbol-capturing subsystem is configured for detecting the region of interest in response to a user-positioned marker, which user-positioned marker is a signal-decreasing marker.

In another aspect, the present invention embraces a method for selectively reading code symbols. According to the method of the present invention, a code symbol reader is provided. The code symbol reader has a code-symbol-capturing subsystem for acquiring information about code symbols within the code-symbol-capturing subsystem's field of view. The code symbol reader also has a code-symbol-decoding processor for decoding code symbols captured by the code-symbol-capturing subsystem. A marked region of interest within the code-symbol-capturing subsystem's field of view is detected by the code symbol reader. Only those code symbols that are within the marked region of interest are decoded by the code symbol reader.

In an exemplary embodiment, the code-symbol-decoding processor of the method according to the present invention is configured to disregard code-symbol information that is outside the marked region of interest.

In another exemplary embodiment of the method according to the present invention, the code-symbol-capturing subsystem's initial field of view is adjusted to an adjusted field of view. The adjusted field of view corresponds to the region of interest. Information about code symbols within the code-symbol-capturing subsystem's adjusted field of view is acquired.

In yet another exemplary embodiment of the method according to the present invention, a region of interest is marked with a user-position marker, which user-positioned marker is a finger.

In yet another exemplary embodiment of the method according to the present invention, a region of interest is marked with a user-position marker, which user-positioned marker is a signal-enhancing marker.

In yet another exemplary embodiment of the method according to the present invention, the marked region of interest is indicated to a user of the code symbol reader by a region-of-interest indicator.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a system for reading code symbols. The term "code symbol" is intended broadly to refer to any machine-readable indicia or device used to store information about an object, including barcodes, linear barcodes, 1D barcodes, matrix barcodes, 2D barcodes, QR codes, RFID tags, and optical character recognition (OCR) symbols. A barcode, for example, is a machine-readable representation of information in a graphic format. The most familiar of these graphic symbols is a series of parallel bars and spaces of varying widths, which format gave rise to the term "barcode."

In some instances, an object may bear more than one code symbol. A code symbol menu (e.g., barcode menu), for example, may display a series of different code symbols arranged in columns and rows. When there are a plurality of code symbols within the field of view of the code symbol reader, the user must determine which code symbol the user wants the code symbol reader to read. The system for reading code symbols according to the present invention can be initialized to read only those code symbols that appear in a selected portion (e.g., the region of interest) within its field of view. Typically, the system is initialized by a marker that indicates region of interest. After the initialization, the system only reads those barcodes which appear within the region of interest.

Referring now to FIG. 1 through FIG. 5, the system 100 for reading code symbols according to the present invention includes a code-symbol-capturing subsystem 110. The code-symbol-capturing subsystem 110 acquires information about code symbols (e.g., code-symbol information) within the code-symbol-capturing subsystem's field of view 116. The form that the code-symbol information takes depends upon the configuration of the code-symbol-capturing subsystem 110. As will be discussed below, the code-symbol-capturing subsystem 110 may be an imaging subsystem 110A, or it may be a laser scanning subsystem 110B. Where an imaging subsystem 110A is employed, the code-symbol information will be a digital image of the code symbol(s), which digital image may be decoded via image processing techniques (e.g., optical character recognition (OCR) techniques). On the other hand, a laser scanning subsystem 110B collects code-symbol information in the form of a reflected optical signal, which signal may be decoded based upon an analysis of the signal's intensity.

The system 100 for reading code symbols according to the present invention also includes a code-symbol-decoding processor 115. The code-symbol-decoding processor 115 processes code-symbol information acquired by the code-symbol-capturing subsystem 110. The code-symbol-decoding processor 115 of the present system 100 is configured to detect a marked region of interest 120 within the code-symbol-capturing subsystem's 110 field of view 116. Unlike traditional code symbol scanners, the code-symbol-decoding processor 115 decodes only the code-symbol information positioned inside the marked region of interest 120. The code-symbol-decoding processor 115 disregards code-symbol information that is outside the marked region of interest 120.

Figure 1:
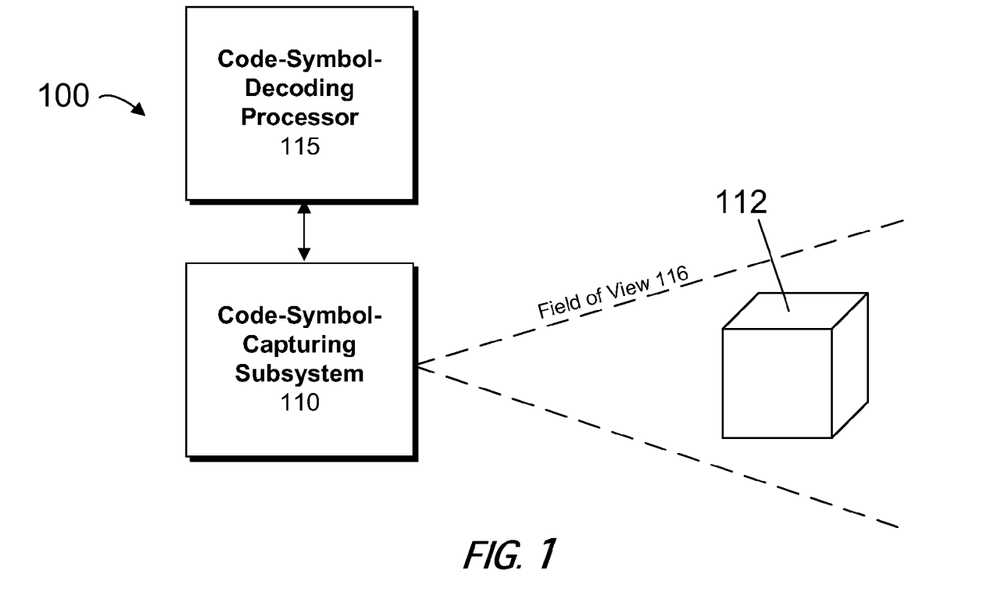
FIG. 1 is a block diagram of an exemplary system for reading code symbols according to the present invention.
Figure 2:
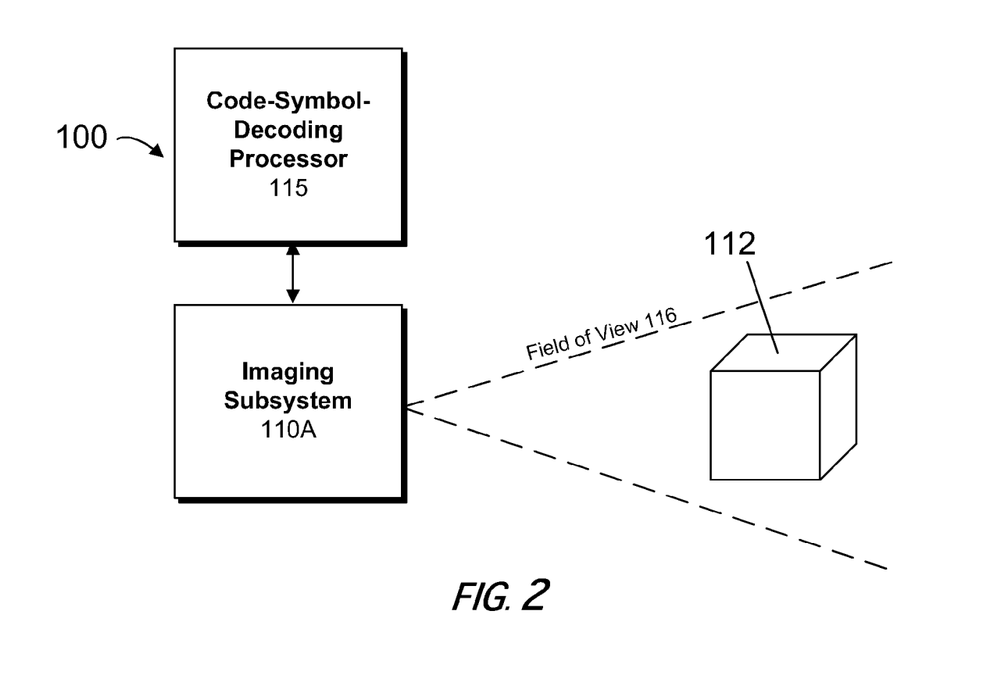
FIG. 2 is a block diagram of a first alternative embodiment of an exemplary system for reading code symbols according to the present invention.

As shown in FIG. 2, in a first alternative exemplary embodiment, the code-symbol-capturing subsystem 110 is an imaging subsystem 110A. The imaging subsystem 110A acquires code-symbol information by gathering light from an object 112 within the imaging subsystem's 110A field of view. Typically, the light is gathered through a lens, where it is focused onto an image sensor (e.g., a CCD, CMOS sensor, or any other sensor typically used in a digital imaging device). For example, the camera component of a smartphone device may serve as the imaging subsystem 110A. The image sensor converts the gathered light into a digital image depicting a two dimensional representation of the object 112 within the imaging subsystem's 110a field of view 116. The digital image represents the code-symbol information that is passed on to the code-symbol-decoding processor 115.

The code-symbol-decoding processor 115 is configured (e.g., through software) to analyze the code-symbol information (e.g., digital image) and detect a marked region of interest 120. For example, the where the object 112 within the imaging subsystem's 110A field of view 116 is a box with four code symbols positioned horizontally in a row, the code-symbol information will be a digital image that includes the four code symbols. The code-symbol-decoding processor 115 will analyze the code-symbol information to determine whether a region of interest 120 has been identified. For example, if the code-symbol-decoding processor determines that the leftmost code-symbol in the row has been marked as the region of interest 120, it will only read (e.g., decode) the leftmost code symbol. The other code symbols in the digital image will be disregarded. In this way, the code-symbol-decoding processor 115 determines that, in this instance, the leftmost code symbol is the region of interest 120. Having been initialized to regard the leftmost code symbol as the region of interest 120, for example, the code-symbol-decoding processor 115 will continue to only decode the leftmost code symbol in all subsequent digital images captured by the imaging subsystem 110A (at least until the system 100 is re-initialized to recognize a different region of interest). Consequently, once the system 100 has been initialized to decode only code symbols within the region of interest 120, the user knows that each time the user scans an object 112 having a row of code symbols, the system 100 will decode only the leftmost code symbol. This advantageously allows a user to continuously scan objects 112 bearing multiple code symbols without uncertainty as to which code symbol will be decoded. In this example, it will always be the leftmost code symbol. Another advantage of this technique is that it reduces the time to process code-symbol information because the code-symbol-decoding processor 115 only has to decode one of the code symbols.

Figure 3:
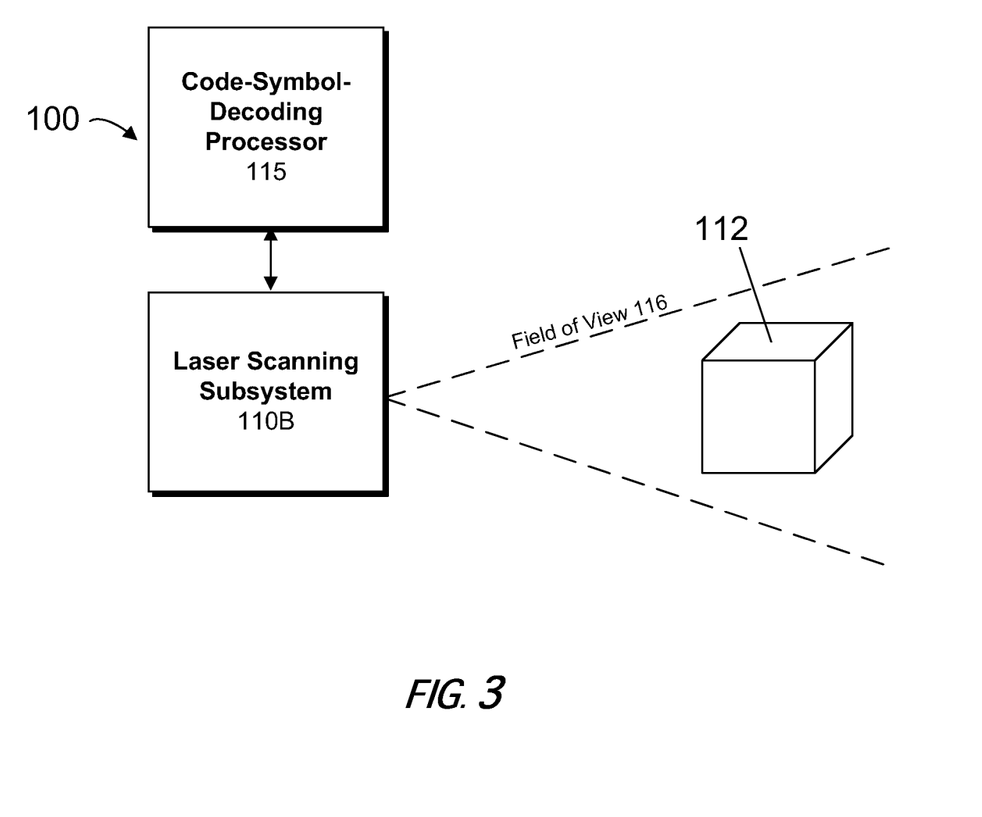
FIG. 3 is a block diagram of a second alternative embodiment of an exemplary system for reading code symbols according to the present invention.

As depicted in FIG. 3, a second alternative embodiment of the system 100 according to the present invention has a code-symbol-capturing subsystem 110 that is a laser scanning subsystem 110B. The laser scanning subsystem 110B gathers code-symbol information by projecting a beam (e.g., laser beam) from a light source (e.g., laser source, LED source) onto an object 112 within the field of view of the laser scanning subsystem 110B. Typically, the laser scanning subsystem 110B then detects the level of reflected light as the light beam sweeps across the code symbol(s) within the field of view. Using this technique, the laser scanning subsystem 110B is able to distinguish between dark areas and light areas on the code symbol (e.g., distinguish between black lines and white lines that form a barcode). More light is reflected from the light areas on the code symbol than the dark areas, so the optical energy reflected back to the laser scanning subsystem 110B will be a signal containing a series of peaks corresponding to the light areas and valleys corresponding to the dark areas. The laser scanning subsystem 110B typically uses a photoreceptor (e.g. photodiode) to receive the optical signal reflected from the code symbol, which optical signal represents code-symbol information that can be decoded by the code-symbol-decoding processor 115.

Figure 4:
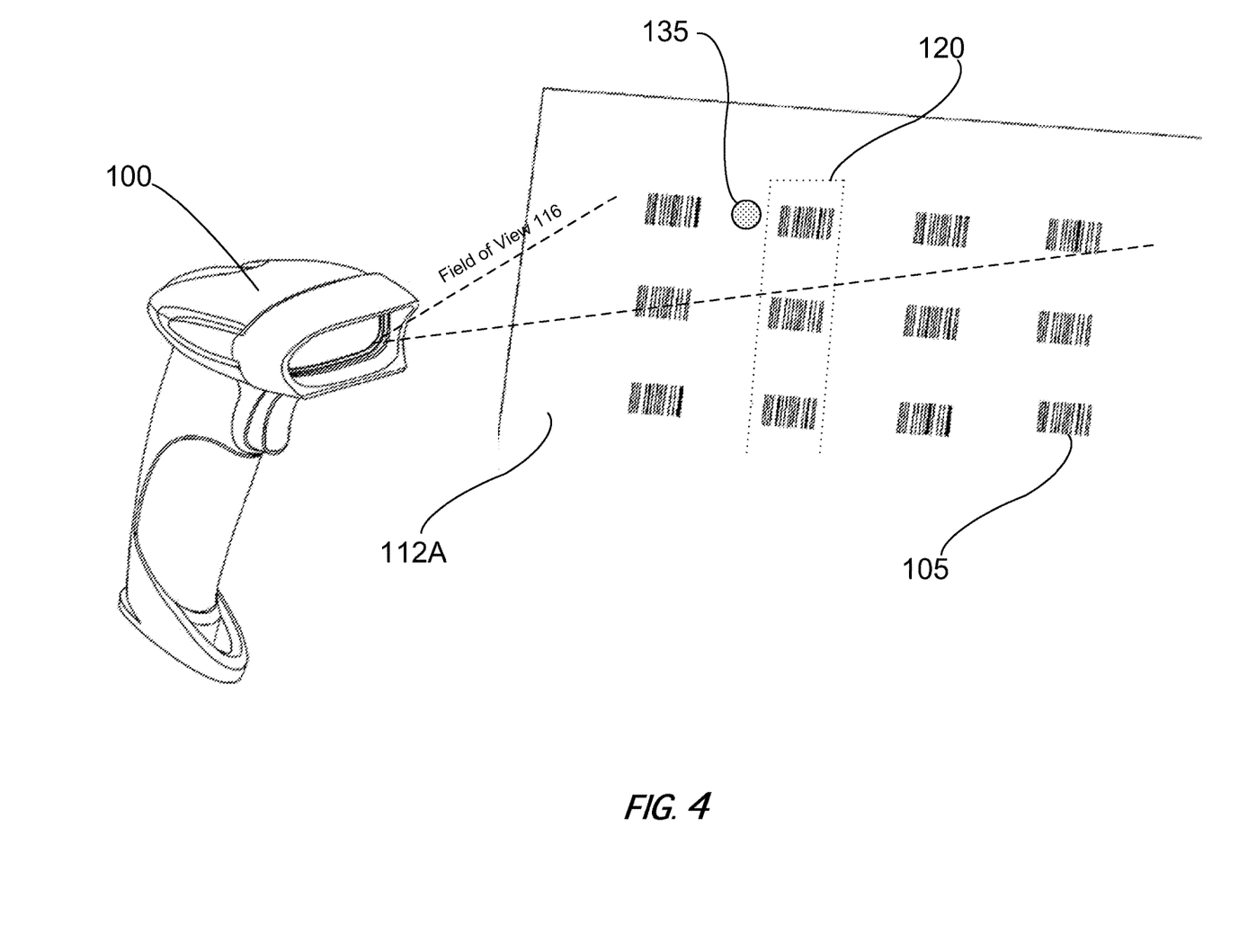
FIG. 4 is an illustration of an exemplary system being used to selectively read a barcode menu.

The region of interest 120 may be designated in various ways. As shown in FIG. 4, the region of interest 120 may be designated by a user-positioned marker 135. The marker 135 indicates which code symbol within the field of view 116 of the code-symbol-capturing subsystem 110 should be decoded, thereby initializing to thereafter decode only those code symbols appearing in the same region of interest 120 (e.g., the same position relative to the field of view 116) as the marked code symbol. In the example shown in FIG. 4, the marker 135 is positioned to the left of the second code symbol in the first row of code symbols on a barcode menu 112A. In this example, the system 100 would be pre-configured to recognize that the area in the field of view 116 that contains the code symbol to the immediate right of the marker 135 represents that portion of the field of view 116 that is the region of interest 120.

The type of marker 135 that is used will typically vary depending upon whether the code-symbol-capturing subsystem 110 is an imaging subsystem 110A or a laser scanning subsystem 110B. Where an imaging subsystem 110A is used, the marker 135 could be any symbol that the code-symbol-decoding processor 115 could recognize (e.g., through OCR techniques) as a marker 135 distinct from the code symbol(s) within the field of view 116. Because a laser scanning subsystem 110B typically cannot be configured to recognize different symbols (e.g., shapes, images) in the way that an imaging subsystem 110A can, a different type of marker is typically used for applications using a laser scanning subsystem 110B. For example, the marker 135 may be an area of enhanced reflectivity (e.g., a reflective sticker) that results in the reflected optical signal being greater than the reflected optical signal from the white spaces in the code-symbol. By using a signal-enhancing marker 135, the system 100 recognizes that the marker 135 is not part of the background of the object 112 (e.g., the white space on the barcode menu 112A page). Similarly, a signal-decreasing marker 135 could be used to create a reflected optical signal that is substantially below the other optical signal valleys. For example, the marker 135 could be a sticker that absorbed more of the light beam than the other areas of the barcode menu 112A on which the sticker was placed. Utilizing a sticker (e.g., a signal-enhancing sticker, a signal-decreasing sticker, or a sticker bearing a symbol) as a marker 135 would advantageously allow a user to define the region of interest 120 at any point in time during the scanning process, and to likewise change the region of interest simply by placing a sticker in a new position relative to the code-symbols within the field of view 116.

Figure 5:
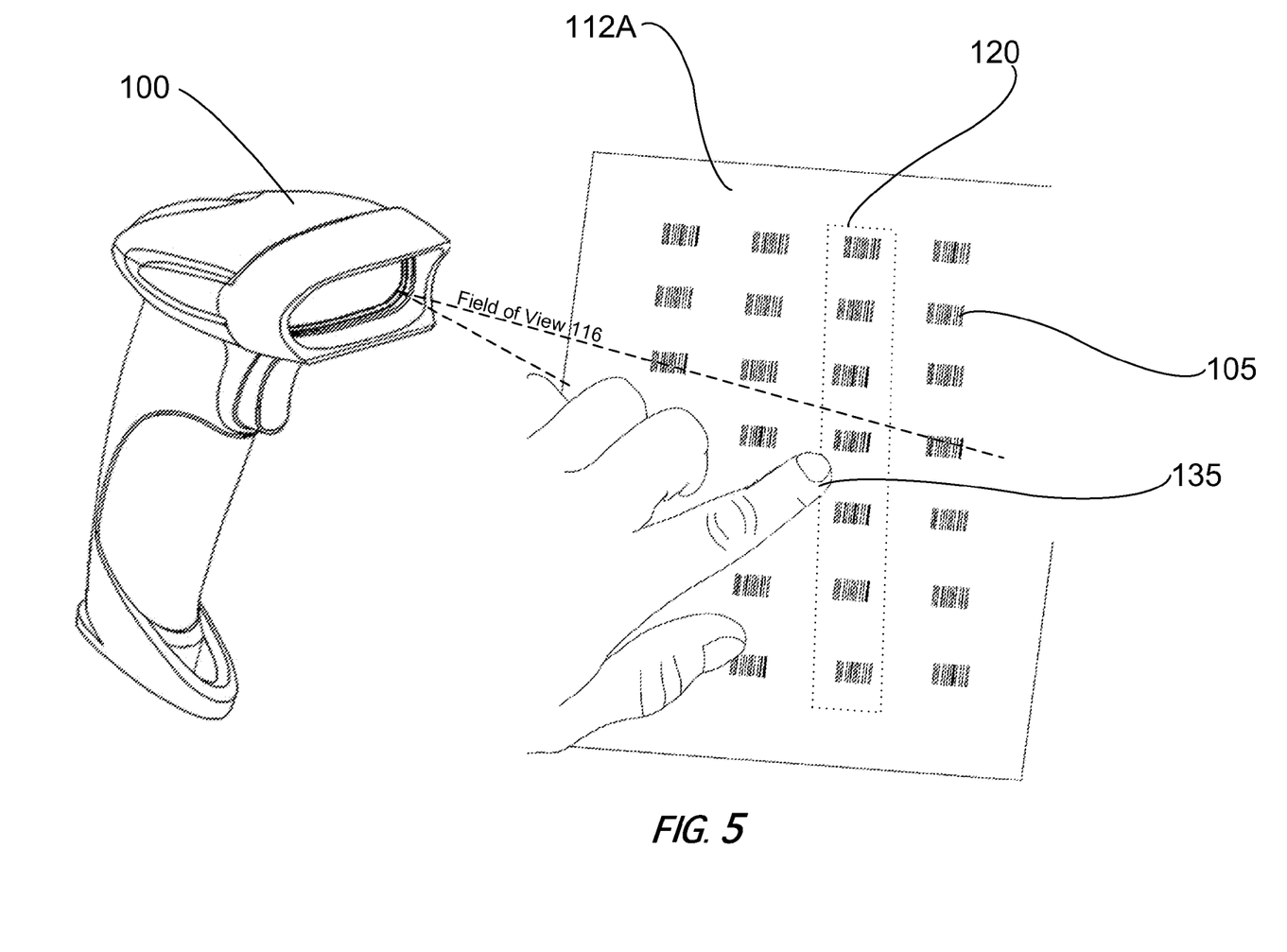
FIG. 5 is an illustration of an exemplary system being used to selectively read a barcode menu.

FIG. 5 illustrates an alternative technique for identifying a region of interest 120. The system 100 could be configured to recognize a finger as a marker 135. To initialize the system 100 to recognize a desired region of interest 120, the user points a finger to an area adjacent to the code symbol within the desired region of interest 120. A system 100 configured to recognize a finger as a marker 135 advantageously allows the user to indicate the region of interest 120 without the need for additional materials (e.g., stickers). Additionally, using a finger as a marker 135 results in quick identification of the region of interest 120 because there is no need to take time to retrieve a sticker, for example, and position the sticker in the appropriate location.

As another example, a code symbol may be used as a marker 135. It will be appreciated by persons of ordinary skill in the art that the settings on code symbol readers are often changed by scanning code symbols containing configuration information recognized by the code reader. Bar code readers, for example, are often configured to desired settings by scanning a barcode that will prompt the barcode reader to change its settings in the desired manner. In the same way, a code symbol could be used as a marker 135 that, when decoded by the system 100, could initialize the system 100 as to the desired region of interest 120. For instance, the code symbol marker 135 could contain information instructing the system 100 to only decode subsequently-scanned code symbols that are in the same region of interest 120 as the code symbol marker 135.

Figure 6:
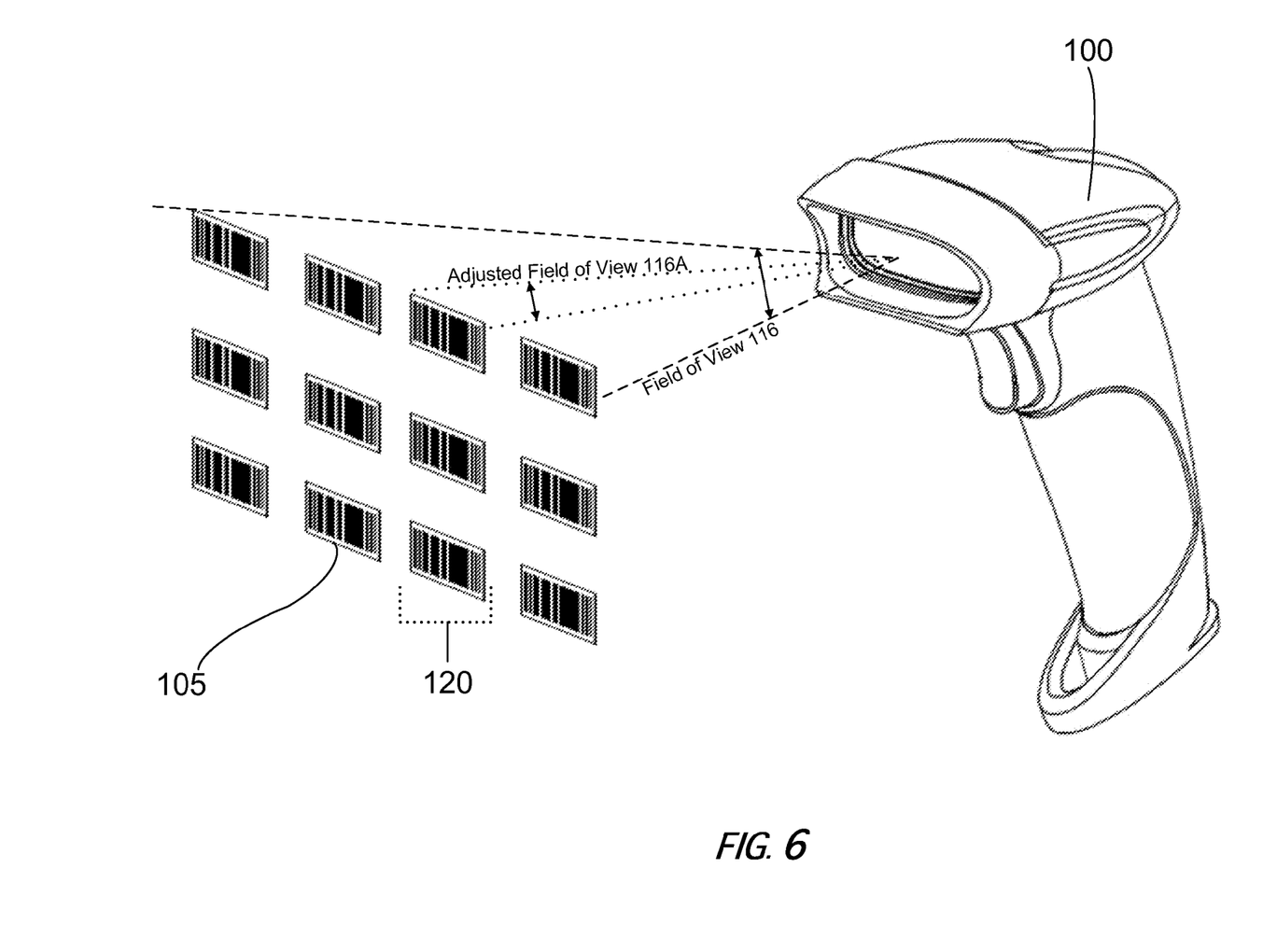
FIG. 6 depicts the adjusted field of view of an exemplary system for reading code symbols according to the present invention.

Referring now to FIG. 6, in another alternative embodiment, the code-symbol-capturing subsystem 110, in response to the detection of a marker 135 within its field of view 116, actually narrows its field of view to an adjusted field of view 116A that includes the region of interest 120 but excludes code symbols outside the region of interest 120. In this way, when the code-symbol-capturing subsystem 110 detects a marker 135, it narrows its field of view 116 such that it will subsequently (at least until re-initialized) scan only the region of interest 120 instead of a broader scan of the entire original field of view (e.g., an entire row of a barcode menu). By initializing the system 100 to adopt an adjusted field of view 116A that only scans the region of interest 120, the system 100 can achieve scans more quickly because it is scanning less of an area.

In a system 100 that utilizes a laser scanning subsystem 110B, for example, the adjusted field of view 116A can be achieved by resetting the sweep angle of the laser to a sweep angle that results in a scan of only the region of interest 120. It will be appreciated by one of ordinary skill in the art that, typically, the sweep angle is adjusted by modifying the rotation of the mirror(s) that reflects the laser substantially linearly across the field of view 116.

It will also be appreciated by a person of ordinary skill in the art that the code-symbol-capturing subsystem 110 will typically require a processor (e.g., a microprocessor, computer processor) to recognize a marker 135 and the associated marked region of interest, and to adjust the initial field of view 116 to an adjusted field of view 116A. This processor may be part of the same module that comprises the code-symbol-decoding processor 115, or this processor may be a separate processor.

By employing the technique of modifying the field of view 116 to an adjusted field of view 116A, only code-symbol information associated with code symbols within the region of interest 120 is transmitted to the code-symbol-decoding processor 115. Because the code-symbol-decoding processor 115 does not have to decipher multiple code symbols and/or determine which code symbol is marked, the decoding process is expedited.

In another alternative embodiment of the system 100 for reading code symbols according to the present disclosure, the adjusted field of view 116A that corresponds to the region of interest 120 is indicated (e.g., visually identified) to the user of the system 100 by a region of interest indicator. Typically, the region of interest indicator will be a light beam that is projected from the system 100 onto the region of interest 120. For example, if the region of interest 120 includes the third of four columns in a barcode menu, the system 100 will project a region of interest indicator (e.g., a blinking dot, a steady dot) onto the barcode appearing in the third column. This region of interest indicator identifies to the user that the system 100 has been initialized to scan only those barcodes that lie within the region of interest, which is presently set to correspond to the third barcode in the row of four barcodes.

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney);

U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); and U.S. patent application Ser. No. 13/933,415 for an Electronic Device Case, filed Jul. 2, 2013 (London et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for reading code symbols on an object, comprising:

a code-symbol-capturing subsystem configured to acquire information about code symbols within a full region of the code-symbol-capturing subsystem's field of view; and a code-symbol-decoding processor configured to:
identify a marker within the full region designating a smaller region within the full region as a region of interest,
detect code-symbol information only within the region of interest,
disregard code-symbol information outside the region of interest, and
detect and decode code-symbols in the region of interest during all subsequent information acquisitions until a new region of interest is designated by the marker.

2. The system for reading code symbols according to claim 1, wherein the code-symbol-capturing subsystem is an imaging subsystem for capturing images within the imaging subsystem's field of view.

3. The system for reading code symbols according to claim 1, wherein the code-symbol-capturing subsystem is a laser scanning subsystem for scanning code symbols within the laser scanning subsystem's field of view.

4. The system for reading code symbols according to claim 1, wherein the code-symbol-decoding processor is configured for identifying the region of interest in response to a user-positioned marker.

5. The system for reading code symbols according to claim 4, wherein the user-positioned marker is a code symbol.

6. The system for reading code symbols according to claim 4, wherein the user-positioned marker is a signal-enhancing marker.

7. The system for reading code symbols according to claim 4, wherein the user-positioned marker is a signal-diminishing marker.

8. A system for reading code symbols on an object, comprising:

a code-symbol-capturing subsystem configured for:
identifying a marker within a full region of the code-symbol-capturing subsystem's field of view, the marker designating a smaller region within the full region as a region of interest; and
adjusting the code-symbol-capturing subsystem's initial full region of the field of view to an adjusted field of view that corresponds to the region of interest, and
acquiring information only about code symbols within the region of interest while disregarding code-symbol information outside the region of interest, and
detecting and decoding code-symbols in the region of interest during all subsequent information acquisitions until a new region of interest is designated by the marker; and a code-symbol-decoding processor for processing code-symbol information acquired by the code-symbol-capturing subsystem.

9. The system for reading code symbols according to claim 8, wherein the code-symbol-capturing subsystem is an imaging subsystem for capturing images of code symbols.

10. The system for reading code symbols according to claim 8, wherein the code-symbol-capturing subsystem is a laser scanning subsystem for scanning code symbols.

11. The system for reading code symbols according to claim 8, wherein the code-symbol-capturing subsystem is configured for identifying the region of interest in response to a user-positioned marker.

12. The system for reading code symbols according to claim 8, wherein the user-positioned marker is a code symbol.

13. The system for reading code symbols according to claim 8, wherein the user-positioned marker is a signal-enhancing marker.

14. The system for reading code symbols according to claim 8, wherein the user-positioned marker is a signal-diminishing marker.

15. A method for selectively reading code symbols on an object, comprising:
provided a code symbol reader having a code-symbol-capturing subsystem for acquiring information about code symbols within the code-symbol-capturing subsystem's field of view, and a code-symbol-decoding processor for decoding code-symbols captured by the code-symbol-capturing subsystem;
identifying a marker within a full region of the field of view, the marker designating a smaller region within the full region as a marked region of interest;
decoding only those code symbols that are within the region of interest; and
detecting and decoding code-symbols in the marked region of interest during all subsequent information acquisitions until a new region of interest is designated by the marker.

16. The method for selectively reading code symbols of claim 15, wherein the code-symbol-decoding processor is configured to disregard code-symbol information that is outside the marked region of interest.

17. The method for selectively reading code symbols of claim 15, comprising:
adjusting the code-symbol-capturing subsystem's initial field of view to an adjusted field of view that corresponds to the marked region of interest; and
acquiring information about code symbols within the code-symbol-capturing subsystem's adjusted field of view that corresponds to the marked region of interest.

18. The method for selectively reading code symbols of claim 15, comprising:
marking the region of interest with a user-positioned marker;
wherein the user-positioned marker is a finger.

19. The method for selectively reading code symbols of claim 15, comprising:
marking the region of interest with a user-positioned marker;
wherein the user-positioned marker is a signal-enhancing marker.

20. The method for selectively reading code symbols of claim 15, comprising:
indicating the marked region of interest to a user of the code symbol reader by a region-of-interest indicator.

* * * * *